United States Patent [19]

Watkins et al.

[11] 4,307,490
[45] Dec. 29, 1981

[54] METHOD AND APPARATUS FOR APPLYING AN ELECTRICAL POTENTIAL TO ANIMAL CARCASSES

[75] Inventors: Robert F. Watkins, Jefferson, S. Dak.; Robert L. Davis; Leslie B. Arndt, both of South Sioux City, NE

[73] Assignee: Iowa Beef Processors, Inc., Dakota City, Nebr.

[21] Appl. No.: 107,943

[22] Filed: Dec. 28, 1979

[51] Int. Cl.³ .............................................. A22B 5/16
[52] U.S. Cl. ...................................... 17/50; 17/1 E; 17/21; 17/25
[58] Field of Search ...................... 17/25, 1 E, 50, 21, 17/45

[56] References Cited

U.S. PATENT DOCUMENTS

| | | | |
|---|---|---|---|
| 2,544,681 | 3/1951 | Harsham et al. | 17/25 UX |
| 2,544,724 | 3/1951 | Rentschler | 17/25 UX |
| 4,221,021 | 9/1980 | Swilley | 17/25 X |

*Primary Examiner*—Willie G. Abercrombie
*Attorney, Agent, or Firm*—Beveridge, DeGrandi, Kline & Lunsford

[57] ABSTRACT

An electrical potential is applied to suspended animal carcasses by a cylindrical carcass-contacting electrode which is continuously rotated about its central axis. A rear portion of the electrode circumference is surrounded by an enclosure within which a cleansing spray is directed on the electrode to avoid cross contamination of carcasses.

24 Claims, 4 Drawing Figures

METHOD AND APPARATUS FOR APPLYING AN ELECTRICAL POTENTIAL TO ANIMAL CARCASSES

BACKGROUND OF THE INVENTION

This invention relates to apparatus for electrically shocking livestock carcasses undergoing processing in a slaughterhouse, wherein the carcasses are contacted by an electrode which is cleansed to avoid cross-contamination between successive carcasses.

A primary utilization of the invention is in conjunction with hide-removal systems in which the hide is pulled over the head of a carcass suspended by its hind legs. It has previously been recognized that it is advantageous to pass an electrical current through such a carcass during the hide pulling step, thereby tightening the muscles of the spinal column to prevent separation of the vertebrae and undue tearing of the meat connected therewith. This basic principle is the subject of U.S. Pat. No. 3,537,130 issued Nov. 3, 1970 to Richard L. McDonnell, where hand-held electrodes are immersed in a cleansing bath between applications to reduce the risk of cross contamination of carcasses.

There have been efforts to mechanize the cleansing of electrodes to avoid cross contamination. A reciprocating electrode, cleansed while retracted, is the subject of U.S. Pat. No. 3,626,550 issued Dec. 14, 1971 to John G. Troy. An electrode which swings back and forth between a carcass contacting position and a retracted cleansing position is disclosed in U.S. Pat. No. 3,863,294 which issued Feb. 4, 1975 to Wilford O. Barbee. Experience has shown that the Barbee device was unreliable and created maintenance problems which rendered it unsuitable for continuous use so that eventually it was deactivated and the sterilization step omitted.

The present invention was developed to avert the shortcomings of the prior art devices mentioned hereinabove and to provide an effective, uncomplicated and relatively inexpensive system for shocking animal carcasses undergoing processing in a slaughterhouse. Primarily, such shocking is deemed desirable during over-the-head hide pulling operations, but it is contemplated that it may also be suitable and effective for electrical stimulation of carcasses for tenderization purposes as described in Australian Pat. Nos. 141,370 and 141,495, classified in U.S. Class 17, subclass 1 E. These Australian patents correspond, respectively, to U.S. Pat. Nos. 2,544,681 and 2,544,724.

SUMMARY OF THE INVENTION

According to this invention, an electrical shocker has an elongated electrode, the peripheral surface of which has a portion which occupies a forward position facing toward and contacting the carcasses and another portion which occupies a rearward position facing away from the carcasses. An electrical potential is applied to the electrode, this potential being different from the electrical potential of the carcasses so that an electrical current will flow through the carcasses.

The electrode is rotated about an axis which lies between the forward and rearward positions occupied by the peripheral surface portions of the electrode, some portions thereof moving from forward positions to rearward positions and other portions thereof moving from rearward positions to forward positions. A portion of the peripheral surface which lies in the rearward position is cleansed to assure that each carcass is contacted only by cleansed surfaces of the electrode to avoid cross contamination of the carcasses.

Preferably, the apparatus is used in conjunction with a support means which includes a conveyor rail substantially parallel to the peripheral surface of the electrode and a trolley which is movable on the rail to suspend the livestock carcass in a position where it contacts the electrode. The electrode is driven in one rotational direction at a constant angular velocity. It may have a tapered end portion for initial contact with the carcass, or it may be totally skewed relative to the rail to ensure adequate carcass contact. An enclosure surrounding the portions of the electrode in the rearward position encloses spraying means which are directed against the electrode.

It is also preferred that the apparatus be used in conjunction with a hide pulling device adjacent to the conveyor rail, such a hide pulling device including a hide gripping means which operates to grip the hide on a carcass at the hide pulling device, and a hide pulling means which moves the hide gripping means relative to the carcass to pull a hide therefrom. The hide pulling means is preferably operable concurrently with the means for applying the electrical potential to the electrode.

Although the invention may take a wide variety of forms, an illustrative embodiment is shown in the accompanying drawings and described in the following text.

BRIEF DESCRIPTION OF A PREFERRED EMBODIMENT

Figure 1:
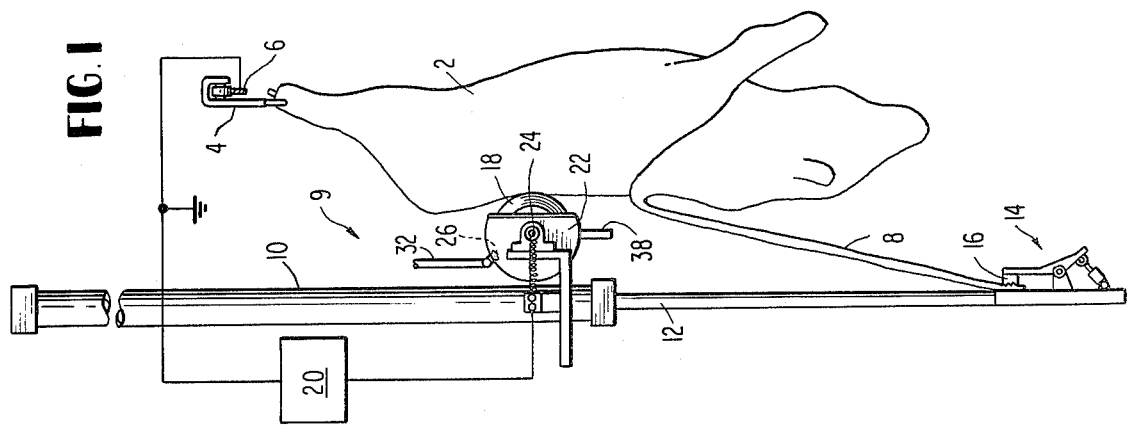
FIG. 1 is an elevational view looking longitudinally of the carcass path, showing the apparatus of the invention at a hide pulling station.

As seen in FIG. 1, the invention is used in association with and as a portion of an over-the-head hide pulling apparatus of the type more fully disclosed in U.S. Pat. No. 3,810,277 which is incorporated herein by reference. In such apparatus, the carcass 2 of a livestock animal is suspended by its rear legs by means of a trolley 4 which rides on a longitudinal conveyor rail 6. Prior to arriving at the hide-removal station, portions of the hide have been separated from the carcass so that the hide 8 hangs downwardly while remaining attached to the upper back and head. The hide pulling device 9 is located adjacent to the rail, and it includes a large vertical hydraulic cylinder 10 which has a rod 12 connected to a hide gripping device 14. The hide gripping device has a jaw 16 which is movable to grip the lower portion of the hanging hide. The hide pulling device is operated by actuating the hide gripping device 14 to grip a hide on a suspended carcass, and actuating the cylinder 10 which acts as a hide pulling means, driving the hide gripping device 14 downwardly to pull the hide from the carcass 2 on the rail 6.

Due to the very high pulling forces exerted by the hide puller, it is desirable to pass an electric current through the carcass to tighten its spinal muscles during the over-the-head hide removal step. This known technique prevents separation of the vertebrae and undue tearing of the meat in the course of the hide-pulling operation.

In the illustrated preferred embodiment of the invention, a carcass 2 is brought into contact with a longitudinally stationary rotatably driven electrode 18 connected to a circuit 20 which provides it with a different electrical potential than the grounded conveyor rail 6. The electrode has a cylindrical peripheral surface, a portion of which is in a forward position where it is exposed to and contacted by the carcass, and another portion of which is in a rearward position within a stationary enclosure 22. The electrode is supported by and affixed to an electrically conductive shaft 24 which is continuously rotated at a constant angular velocity in one rotational direction so that there is a continuous movement of some portions of the electrode surface from the forward exposed positions to the rearward enclosed positions, while other portions of the electrode surface are moved from enclosed rearward positions to exposed forward positions. The portions of the electrode surface within the enclosure 22 are subjected to the cleansing action of a series of spray heads 26. Such cleansing assures that the carcass will be contacted only by the cleansed electrode surfaces, thereby avoiding cross-contamination between carcasses.

Figure 2:
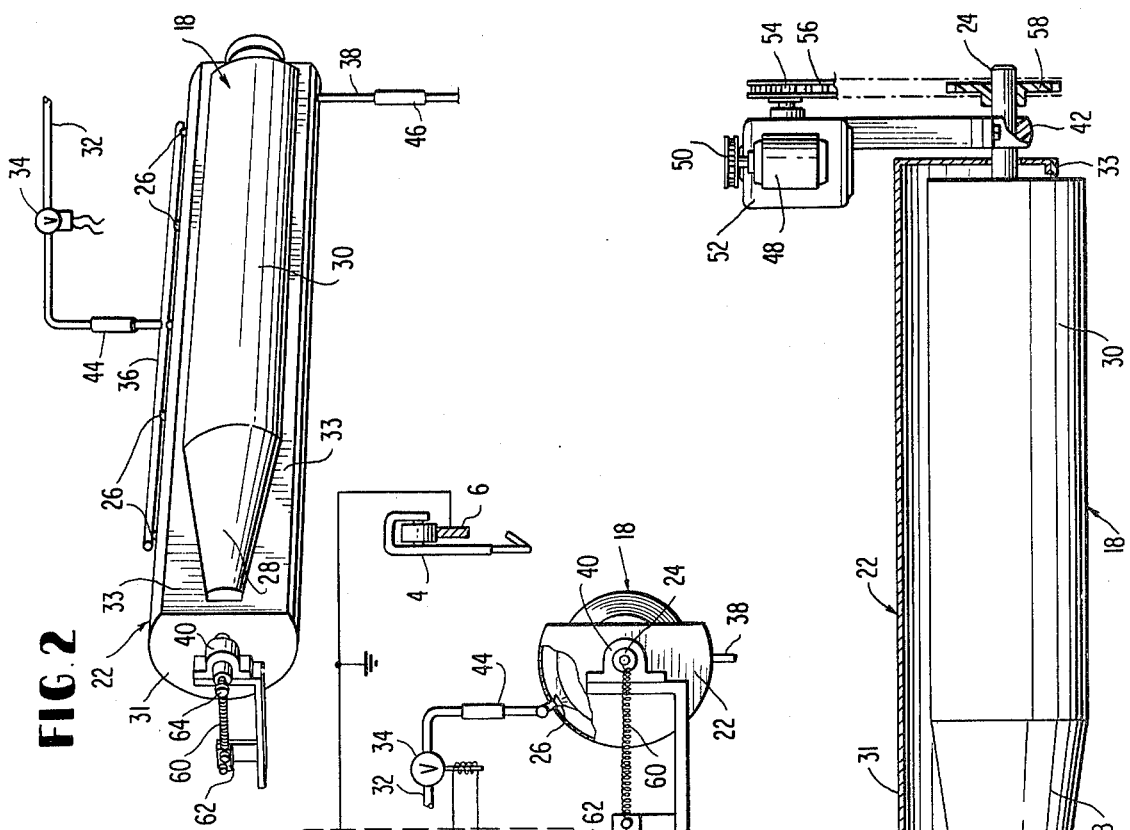
FIG. 2 is a perspective view of a preferred form of electric shocker construction according to the invention.
Figure 4:
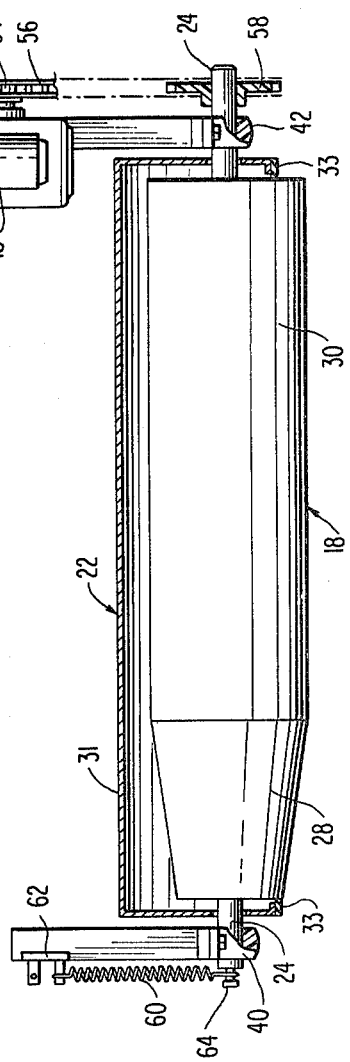
FIG. 4 is a plan view, taken partially in section, of an apparatus constructed according to the invention.

FIGS. 2 and 4 show the elongated configuration of the electrode 18. Its peripheral surface includes a tapered or conical leading portion 28 which is skewed relative to the carcass-supporting rail, and a trailing portion 30 which is cylindrical and parallel to the conveyor rail 6. The spacing between the rail 6 and the electrode 18 is such that a carcass moving along the rail will first come into contact with the tapered conical portion 28. This guides the carcass onto the cylindrical portion 30 where it lies during the hide-pulling operation. Alternatively, the entire electrode 18 may be cylindrical, but when such a structure is used, it is desirable to skew the central rotational axis of the cylinder relative to the conveyor rail so that the electrode surface will be inclined relative to the path of infeeding carcasses to ensure proper electrode contact during the hide pulling operation.

Figure 3:
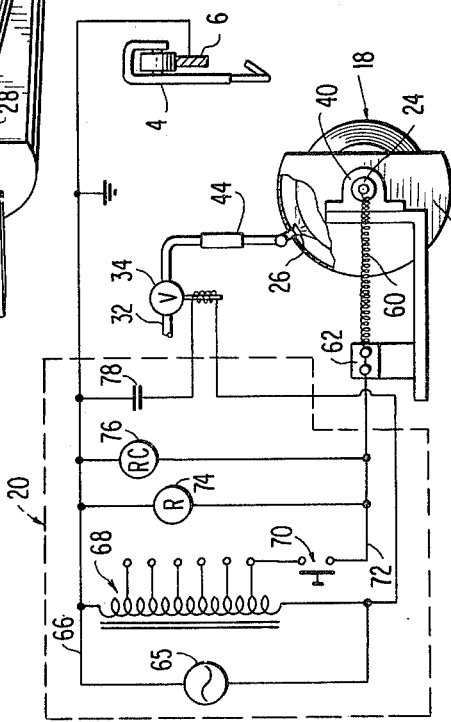
FIG. 3 is a transverse view of an electric shocker constructed according to the invention, also showing the electrical circuit used in conjunction therewith.

The enclosure 22 is shown in FIGS. 2–4. It includes a stationary rigid housing 31 with end walls, an arcuate rear wall, and a planar forward wall 33 which is formed of sheets of rubber or other nonconductive flexible sheet material. The interior edges of the wall 33 lie in contact with the peripheral surface of the electrode to provide a sealing means which deters the escape of sprayed liquid from the enclosure.

The electrode cleansing system includes a hot water supply pipe 32 provided with a normally open solenoid valve 34. As shown in FIG. 2, the outlet side of the valve is connected to a manifold pipe 36 which has a plurality of the spray heads 26 disposed at spaced intervals along its length to ensure that the entire length of the electrode 18 is cleansed. The spray heads 26 are directed into the enclosure 22 toward the electrode 18 as shown in FIG. 3. After striking the electrode 18, the water flows gravitationally to the bottom of the enclosure 22 and into the drain line 38.

The electrode is electrically insulated from the elements which support and drive it, such insulation being achieved by supporting the electrode shaft 24 in nonconductive polyurethane bearings 40 and 42, and providing insulating rubber hose sections 44 and 46 in the liquid feed and liquid drain lines as shown in FIG. 2.

The rotary drive means for the electrode, shown in FIG. 4, includes an electric motor 48 connected by a V-belt 50 to the input pulley (not shown) of a gearbox 52. The gearbox output shaft is provided with a sprocket 54 engaged by a drive chain 56, the opposite end of which rides on a sprocket 58 keyed to the electrode shaft 24. This latter sprocket 58 is formed of electrically non-conducting material such as polyurethane to prevent the electrode from grounding out to the drive system.

The electrical potential is provided to the electrode by means of a simple rotary coupling seen best in FIGS. 2 and 4. This coupling includes a resilient tension spring 60 formed of electrically conductive material. One end of the spring 60 is mounted on a terminal block 62 where it is connected to a source of elecrical power, preferably 115 volt alternating current. The other end of the spring 60 is looped over the shaft of a bolt 64 located at the end of the electrode shaft 24. The enlarged head of the bolt 64 retains the spring in position and the tension of the spring 60 ensures that electrical contact will be maintained between the spring and the electrode shaft 24.

The circuit 20 for the shocker apparatus is shown in FIG. 3. A conventional household type alternating current system provides the alternating current source 65 which includes a grounded neutral wire 66 connected to the conveyor rail 6. A variable auto-transformer 68 for the electric shocker is wired across the power source and its variable output terminal is connected to a foot pedal switch 70 which is operated concurrently with the hide puller cylinder 10. Conductors 72 from the switch 70 lead to an indicating light 74, the electrode 18 and a relay coil 76 associated with the relay contacts 78. When the relay coil 76 is actuated, the contacts 78 are closed to actuate and close the solenoid valve 34, deactivating the nozzles 26 when the electrical potential is applied to the electrode 18. Upon completion of a hide pulling cycle, the foot pedal 70 is released so that the light 74 goes out, the shocker drum 18 is deactivated and the relay coil 76 is deactivated so the solenoid valve 34 will reopen to resume cleansing of the electrode.

When the apparatus is in operation, the relationship between the carcass conveyor velocity and the tangential velocity of the electrode should be such that the carcass will only contact previously-cleansed portions of the electrode. During the time interval that a carcass moves a distance equal to the length of the electrode, the circumference of the electrode should not move a distance which is greater than the electrode circumference within the enclosure 22. Prior to the arrival of a carcass at the electrode, the solenoid valve 34 is open so that spray heads 26 will cleanse the electrode portions within the enclosure 22. During this cleansing, the electrode is being rotated by the drive motor 48, but it is not energized by the alternating current source 65. Carcasses on trolleys 4 are driven along the conveyor rail 6 at a constant velocity. When a carcass approaches the hide pulling station, it first strikes the conical portion 28 of the electrode 18. It then moves forwardly onto the cylindrical portion 30. A workman places the hanging portion of the hide 8 in the hide gripping device 14, after which another workman simultaneously closes the switches which actuate the hide gripping device 14, the hide pulling device 9 and connect the electrode 8 to the AC source 65. This also terminates the electrode cleansing operation as the relay coil 76 closes relay contacts 78 to close the normally open solenoid valve 34. The electrode continues to rotate as the carcass continues its movement so that the contact between the carcass and the electrode is essentially a very shallow helix portion, the circumferential component of which is sufficiently small so that it may be fully cleansed in the enclosure 22 before it is returned to a position exposed to a subsequent carcass. After the hide pulling device 9 has completed its operation, the foot pedal switch 70 is opened to disconnect the electrode 18 from the AC source 65 and to open the solenoid valve 33 so that spray heads 26 will resume their cleansing action on the portions of the electrode 18 within the enclosure 22. Of course, this cleansing action continues until a subsequent carcass is positioned against the electrode and the hide pulling device 9 is again operated.

Persons familiar with the field of the invention will realize that the practice by a wide variety of systems other than the specific preferred one illustrated hereinabove. Accordingly, it is emphasized that the invention is not limited only to the disclosed embodiment but is embracing of modifications thereof and variations thereto which fall within the spirit of the following claims.

What is claimed is:

1. An electric shocker for livestock carcasses which are supported on an elongated rail, comprising,
   an elongated electrode having a central longitudinal axis adapted to lie generally parallel to the carcass-supporting rail, said electrode having a carcass-contacting peripheral surface which is longitudinally stationary, said peripheral surface having a longitudinally elongated portionn which is electrically conductive and occupies a forward position facing toward the carcasses, said peripheral surface having another longitudinally elongated portion which is electrically conductive and occupies a rearward position facing away from the carcasses, said central longitudinal axis lying between the forward and rearward positions occupied by the peripheral surface portions of the electrode,
   means for applying an electrical potential to the electrode which is different from the electrical potential of the carcasses to cause an electrical current to flow through the carcasses when they are contacted by the electrode,
   drive means for rotating the electrode about said central longitudinal axis which lies between the forward and rearward positions occupied by the peripheral surface portions of the electrode, said drive means moving some portions of the peripheral surface of the electrode from forward positions to rearward positions, while moving other portions of the peripheral surface of the electrode from rearward positions to forward positions, and
   means for cleansing a portion of the peripheral surface which lies in a rearward position to assure that each carcass is contacted only by cleansed surfaces of the electrode to avoid cross contamination of the carcasses.

2. An apparatus according to claim 1 wherein said peripheral surface of the elongated electrode is cylindrical.

3. An apparatus according to claim 2 wherein said electrode has a tapered end portion.

4. An apparatus according to claim 1 including an enclosure for surrounding the portion of the electrode which is in said rearward position, said cleansing means including spraying means located within the enclosure and direct toward said portion of the electrode in the rearward position.

5. An apparatus according to claim 4 wherein said enclosre includes a sealing means in contact with the peripheral surface of the elongated electrode.

6. An apparatus according to claim 1 wherein said drive means continuously rotates said elongated electrode in one rotational direction at a constant angular velocity.

7. An apparatus according to claim 1 in combination with a support means for suspending a livestock carcass in a position where it lies in contact with said electrode.

8. An apparatus according to claim 7 wherein said support means includes a conveyor rail and a trolley movable thereon.

9. An apparatus according to claim 8 wherein said rail is substantially parallel to said peripheral surface of the electrode.

10. An apparatus according to claim 8 wherein said electrode includes a surface which is skewed relative to the rail.

11. An apparatus according to claim 10 wherein said peripheral surface of the elongated electrode is cylindrical.

12. An apparatus according to claim 11 wherein said electrode has a tapered end portion.

13. An apparatus according to claim 10 including an enclosure for surrounding the portion of the electrode which is in said rearward position, said cleansing means including spraying means located within the enclosure and directed toward said portion of the electrode in the rearward position.

14. An apparatus according to claim 13 wherein said enclosure includes a sealing means in contact with the peripheral surface of the elongated electrode.

15. An apparatus according to claim 8 located at a hide pulling device adjacent to said rail, said hide pulling device being provided with a hide gripping means and a hide pulling means, said hide gripping means being operable to grip a hide on a carcass suspended at the hide pulling device, and said hide pulling means being operable to move said hide gripping means relative to the carcass to pull a hide from the carcass on the rail.

16. An apparatus according to claim 15 wherein said hide pulling means is operable concurrently with the means for applying an electrical potential to the electrode.

17. An apparatus according to claim 15 wherein said peripheral surface of the elongated electrode is cylindrical.

18. An apparatus according to claim 17 wherein said electrode has a tapered end portion.

19. An apparatus according to claim 15 including an enclosure for surrounding the portion of the electrode which is in said rearward position, said cleansing means including spraying means located within the enclosure and directed toward said portion of the electrode in the rearward position.

20. An apparatus according to claim 19 wherein said enclosure includes a sealing means in contact with the peripheral surface of the elongated electrode.

21. A method of electrically shocking a livestock carcass which is supported on an elongated rail, comprising the steps of, contacting a carcass with a longitudinally stationary elongated electrode having a central longitudinal axis which is generally parallel to the rail supporting the carcass, said electrode having a peripheral surface with a longitudinally elongated portion which is electrically conductive and occupies a forward position facing toward the carcasses, said peripheral surface having another longitudinally elongated portion which is electrically conductive and occupies a rearward position facing away from the carcasses, said central longitudinal axis lying between the forward and rearward positions occupied by the peripheral surface portions of the electrode, applying an electrical potential to the electrode which is different from the electrical potential of the carcass to cause an electrical current to flow through the carcass, rotating the electrode about said central longitudinal axis which lies between the forward and rearward positions occupied by the peripheral surface portions of the electrode, said rotating step moving some portions of the peripheral surface of the electrode from forward positions to rearward positions, while moving other portions of the peripheral surface of the electrode from rearward positions to forward positions, and cleansing a portion of the peripheral surface which lies in a rearward position to assure that a subsequent carcass will be contacted only by cleansed surfaces of the electrode to avoid cross contamination of carcasses.

22. The method of claim 21 wherein the cleansing step is performed by directing a spray of cleansing liquid toward said portion of the electrode in the rearward position.

23. The method of claim 21 wherein the rotating step is performed by rotating said elongated electrode in one rotational direction at a constant angular velocity.

24. The method of claim 21 including the steps of gripping a hide on the carcass contacted by the electrode, and moving said hide gripping means relative to the carcass to pull a hide from the carcass.

* * * * *